United States Patent [19]
Davis

[11] Patent Number: 5,602,945
[45] Date of Patent: Feb. 11, 1997

[54] THRUST BEARING FOR USE IN A CONICAL CRUSHER

[75] Inventor: D. Carter Davis, New Berlin, Wis.

[73] Assignee: Nordberg, Incorporated, Milwaukee, Wis.

[21] Appl. No.: 620,135

[22] Filed: Mar. 21, 1996

[51] Int. Cl.$^6$ ................................................ F16C 33/10
[52] U.S. Cl. ........................................ 354/368; 384/420
[58] Field of Search ................................ 384/121, 123, 384/368, 420

[56] References Cited

U.S. PATENT DOCUMENTS

| | | | |
|---|---|---|---|
| 1,786,565 | 12/1930 | Freeman | 384/368 |
| 2,081,063 | 5/1937 | Oliver | 384/368 |
| 3,193,052 | 7/1965 | Baumler et al. | 384/368 X |
| 3,544,179 | 12/1970 | DeLeu | 384/368 |
| 4,010,905 | 3/1977 | Motz et al. | 241/295 |
| 4,012,000 | 3/1977 | Davis et al. | 241/290 |
| 4,359,208 | 11/1982 | Kelm et al. | 254/362 |
| 4,384,684 | 5/1983 | Karra | 241/26 |
| 4,478,373 | 10/1984 | Gieschen | 241/208 |
| 4,560,113 | 12/1985 | Szalanski | 241/275 |
| 4,575,014 | 3/1986 | Szalanski et al. | 241/275 |
| 4,620,185 | 10/1986 | Plahmer | 340/682 |
| 4,658,638 | 4/1987 | Plahmer | 73/7 |
| 4,659,026 | 4/1987 | Krause et al. | 241/275 |
| 4,671,464 | 6/1987 | Karra et al. | 241/21 |
| 4,750,679 | 6/1988 | Karra et al. | 241/41 |
| 4,750,681 | 6/1988 | Sawant et al. | 241/208 |
| 4,756,484 | 7/1988 | Bechler et al. | 241/275 |
| 4,956,078 | 9/1990 | Magerowski et al. | 209/254 |
| 5,029,761 | 7/1991 | Bechler | 241/275 |
| 5,031,843 | 7/1991 | Motz | 241/21 |
| 5,042,732 | 8/1991 | Karra et al. | 241/207 |
| 5,092,529 | 3/1992 | Bechler et al. | 241/192 |
| 5,110,057 | 5/1992 | Karra et al. | 241/30 |
| 5,372,318 | 12/1994 | Jacobson | 241/207 |

*Primary Examiner*—Thomas R. Hannon
*Attorney, Agent, or Firm*—Foley & Lardner

[57] ABSTRACT

A thrust bearing system for use in a conical rock crusher is located between a rotational eccentric mechanism and a stationary frame of the rock crusher. The thrust bearing system comprises a stationary bearing and rotatable bearing, each bearing including an annular, generally flat plate centered about a bearing axis. Each flat plate has a generally planar wearing surface and an opposite surface. The wearing surface of the rotatable bearing is configured for concentric, sliding engagement with the wearing surface of the stationary bearing. The wearing surface of the rotatable bearing also includes a plurality of lubrication grooves. Each groove has a length extending in a radial direction of the annular plate from an inner wall of the annular plate across the wearing surface to an outer wall of the annular plate. Each groove has a generally triangular cross section throughout the entire length of the groove.

23 Claims, 8 Drawing Sheets

THRUST BEARING FOR USE IN A CONICAL CRUSHER

FIELD OF THE INVENTION

The present invention relates to conical crushers designed for the comminution of rocks or other materials. More specifically, the present invention relates to the relative wearing surfaces of a thrust bearing for use in such crushers.

BACKGROUND OF THE INVENTION

Generally, a conical crusher is comprised of a head assembly including a conical crusher head which gyrates about a vertical axis by means of an eccentric mechanism. The eccentric mechanism is driven by any one of a number of power drives such as diesel engines or electrical motors. The exterior of the conical head is covered by a wearing mantle which engages the material being crushed. Spaced circumferentially around the head assembly and fixed to a stationary frame of the crusher is a bowl fitted with a bowl liner. The bowl liner provides an opposing surface for the mantle during the crushing operation.

Typically, the opposing surfaces of the mantle and bowl liner form a downwardly tapering crushing cavity which is generally V-shaped in cross-section. Such an arrangement is disclosed in commonly assigned U.S. Pat. No. 4,750,681. The width of this cavity at the crusher setting, or narrowest point between the bowl liner and the head, determines the maximum particle size in the crushed material.

Conical crushers contain components such as bearings, shafts, seals, bushings and other devices for permitting relative movement between working parts which enable the rock crushing operation. Some working parts are particularly subject to severe operating conditions and require periodic maintenance and replacement. One such part is the thrust bearing used for supporting the eccentric mechanism for rotation about the vertical axis.

In conical crushers of the type used to employ this invention, an upper bearing and a lower bearing are configured for concentric, sliding engagement with each other, thus forming a thrust bearing assembly or system. The two bearings can be made of the same metal, such as steel or bronze, or they can be made of different metals, such as one steel and the other bronze. The lower bearing is fixed to the stationary frame of the rock crusher, and the upper bearing is fixed to the eccentric mechanism. The lower bearing is provided with a generally uninterrupted wearing surface or race on which the upper bearing rides. The upper bearing has a number of channels or grooves leading from an inner edge of the bearing across the wearing surface to an outer edge of the bearing for providing lubrication to the wearing surfaces of the upper and lower bearings.

Various lubrication groove configurations are known in the art. An upper thrust bearing 20, shown in prior art FIGS. 1 and 2, includes a plurality of grooves 21 in a known groove configuration. Bearing 20 is used in the NORDBERG MP 1000 line of rock crushers. Each groove 21 of bearing 20 requires several milling or machining operations. In particular, a central cut 22 is made at a depth of about 18 millimeters extending across an annular wearing surface 24 of bearing 20 from an inner wall 26 to within about 10 millimeters of an outer wall 28. In another machining operation, a bleed hole 25 is made in each groove 21 at about 5 millimeters off the bottom of groove 21 extending from the outer end of cut 22 to outer wall 28 of bearing 20. Bleed hole 25 allows excess lubrication to exit groove 21 which in turn allows fresh lubrication to enter groove 21. Thus, bleed hole 25 prevents excess heat in bearing 20 as a result of pooling of heated lubrication. In yet another machining operation, a shallow ramp 30 is milled across wearing surface 24 adjacent the rotationally trailing edge of cut 22. In addition to the expense of multiple milling operations, bearing 20 has another drawback in that ramp 30 is so shallow that it wears out relatively quickly, and thus requires frequent replacement. In particular, ramp 30 is only about 0.2 millimeters deep at points immediately adjacent cut 22. Thus, with bearing 20 having a total thickness of about 45 millimeters, bearing 20 requires replacement when only about 0.5% of the thickness of bearing 20 has been worn away. An additional expense in manufacturing bearing 20 results from bearing 20 having a separate annular mounting ring 34 for locating bolt holes 36, adding to the material costs.

Replacing worn thrust bearings is particularly time consuming because the crusher must be dismantled and then reassembled, which on a typical crusher may require from 50 to 100 man hours. Further, replacing these bearings is costly due to high material cost associated with the bearings, which often have very large diameters. For example, bearing 20 of the MP100 rock crusher has an outer diameter of 1090 millimeters (or, about 3'7").

An upper thrust bearing 40, shown in prior art FIGS. 3 and 4, includes a plurality of grooves 41 in another known groove configuration. Bearing 40 is used in the NORDBERG WF800 and HP700 lines of rock crushers. Each groove 41 of bearing 40 includes a central cut 42 having a depth of about 13 millimeters, but which is otherwise similar to central cut 22 of bearing 20 described with respect to FIGS. 1 and 2. However, unlike ramp 30 of bearing 20, a ramp 44 in bearing 40 is relatively deeper. In particular, ramp 44 has a depth of about 4.7 millimeters adjacent a trailing edge 47 of cut 42 and a maximum depth of about 8.0 millimeters along an outer wall 45 as shown at 49. The increased depth of ramp 44 eliminates the need for a separate bleed hole for groove 41 and, at the same time, increases the service life of bearing 40. Also, with bolt holes 46 positioned directly on a wearing surface 48 of bearing 40, no extra material is required for a separate mounting ring, reducing material costs. On the other hand, with bolt holes 46 so positioned, wearing surface 48 between grooves 41 is interrupted by bolt holes 46. A further disadvantage of this groove configuration is that at least two machining operations are required to make each groove 41. In particular, central cut 42 requires a machining operation and ramp 44 requires another machining operation.

Upper thrust bearings 60 and 70, shown in prior art FIGS. 5–6 and 7–8, respectively, each include a plurality of grooves 61 and 71, respectively, in additional known groove configurations. Bearing 60 is used in the NORDBERG HP500 line of rock crushers and bearing 70 is used in the NORDBERG 1560 OMNICONE line of rock crushers. Each groove 61 of bearing 60 includes a central, semi-circular cut 62 having a radius of about 13 millimeters and a depth of about 11 millimeters. Additionally, each groove 61 includes a ramp 64 extending from a trailing edge of cut 62 to a wearing surface 66. Each groove 71 of bearing 70 is basically the same as groove 61 in bearing 60, except that groove 71 has a pair of ramps 72, 76 adjacent a central, semi-circular cut 74, instead of just the one ramp 64 of groove 61. Thus, whereas each groove 61 in bearing 60 requires at least two machining operations, each groove 71 in bearing 70 requires at least three machining operations. In particular, each groove 61 requires a machining operation for central cut 62 and another machining operation for ramp 64; and each groove 71 requires a machining operation for central cut 74, another machining operation for ramp 72, and yet another machining operation for ramp 76.

Thrust bearings are costly to manufacture because of the expensive machinery required. Therefore, elimination of one or more machining steps would lead to increased efficiencies for operating these machines, thus reducing the costs of producing bearings.

Thus, there is a need for a thrust bearing for a conical crusher having a wearing surface configured to allow continued service life even when significant erosion of the wearing surface has taken place. There is also a need for a thrust bearing which provides an uninterrupted contact area between the lubrication grooves of the wearing surface. There is further a need for a thrust bearing for a conical crusher which is less expensive to manufacture.

SUMMARY OF THE INVENTION

The present invention is related to a thrust bearing system for use in a conical rock crusher. The thrust bearing system comprises first and second bearings located between a rotational eccentric mechanism and a stationary frame of the rock crusher. Each bearing includes an annular, generally flat plate centered about a bearing axis. The flat plate has a generally planar wearing surface and an opposite surface. The wearing surface of the first bearing is configured for concentric, sliding engagement with the wearing surface of the second bearing. The wearing surface of the first bearing also includes a plurality of lubrication grooves. Each groove has a length extending in a radial direction of the annular plate from an inner wall of the plate across the wearing surface to an outer wall of the plate. Each groove has a generally triangular cross section throughout the entire length of the groove.

The present invention also relates to a rock crusher having a frame, a vertical shaft fixedly mounted to the frame, and an eccentric rotatably supported about the shaft by a thrust bearing assembly. The thrust bearing assembly comprises a nonrotatable or stationary annular thrust bearing and a rotatable annular thrust bearing. The stationary bearing is fixedly mounted to the frame and coaxial with the shaft. The stationary bearing has a lower surface facing the frame and an upper, generally horizontal surface facing opposite from the lower surface. The rotatable bearing is fixedly mounted to the eccentric and coaxial with the shaft and stationary bearing. The rotatable bearing has an upper surface facing the eccentric and a lower, generally horizontal surface facing opposite from the first surface. The lower surface of the rotatable bearing is disposed concentrically with the upper surface of the stationary bearing for concentric sliding engagement therewith. The lower surface of the rotatable bearing includes a plurality of spaced apart lubrication channels, each channel comprising a first ramp diverging from the lower surface of the rotatable bearing and a second ramp extending from an intersection with the first ramp to the lower surface of the rotatable bearing. Each channel is capable of being cut in a single machining operation.

The present invention also relates to a rotatable annular thrust bearing for use in a thrust bearing assembly of a rock crusher for rotatably supporting an eccentric about a vertical shaft fixedly mounted within a frame of the crusher. The thrust bearing assembly includes a nonrotatable annular thrust bearing adapted to be fixedly mounted to the frame and coaxial with the shaft. The nonrotatable bearing has a lower surface facing the frame and an upper, generally horizontal surface facing opposite from the lower surface. The rotatable bearing is fixedly mounted to the eccentric, and includes an upper surface facing the eccentric and a lower, generally horizontal surface facing opposite from the upper surface. The lower surface has a plurality of grooves. Each groove comprises a first ramp diverging from the lower surface and a second ramp extending from an intersection with the first ramp to the lower surface of the rotatable bearing. Each groove is capable of being cut in a single machining operation.

It is an object of the present invention to provide a thrust bearing for a conical crusher in which lubrication grooves in the wearing surface are configured to allow useful service life of the bearing even when significant erosion of the wearing surface has taken place.

It is another object of the present invention to provide a thrust bearing for a conical crusher in which the contact area of the wearing surface is uninterrupted except at the lubrication grooves.

It is another object of the present invention to provide a thrust bearing for a conical crusher which is less expensive to manufacture.

Further objects and features of the present invention will be apparent from the following specifications and claims when considered in connection with the accompanying drawings illustrating the preferred exemplary embodiment of the present invention.

BRIEF DESCRIPTION OF THE DRAWINGS

The invention will be further described with reference to the accompanying drawings, wherein like numerals denote like elements.

DETAILED DESCRIPTION OF PREFERRED EMBODIMENTS

The present invention will now be described in combination with a rock crusher suitable for employing the preferred embodiment of the invention. Although the rock crusher will be described only generally herein, further details of the rock crusher can be found in commonly assigned U.S. Pat. No. 4,750,681 to Sawant et al., issued Jun. 14, 1988.

Figure 1:
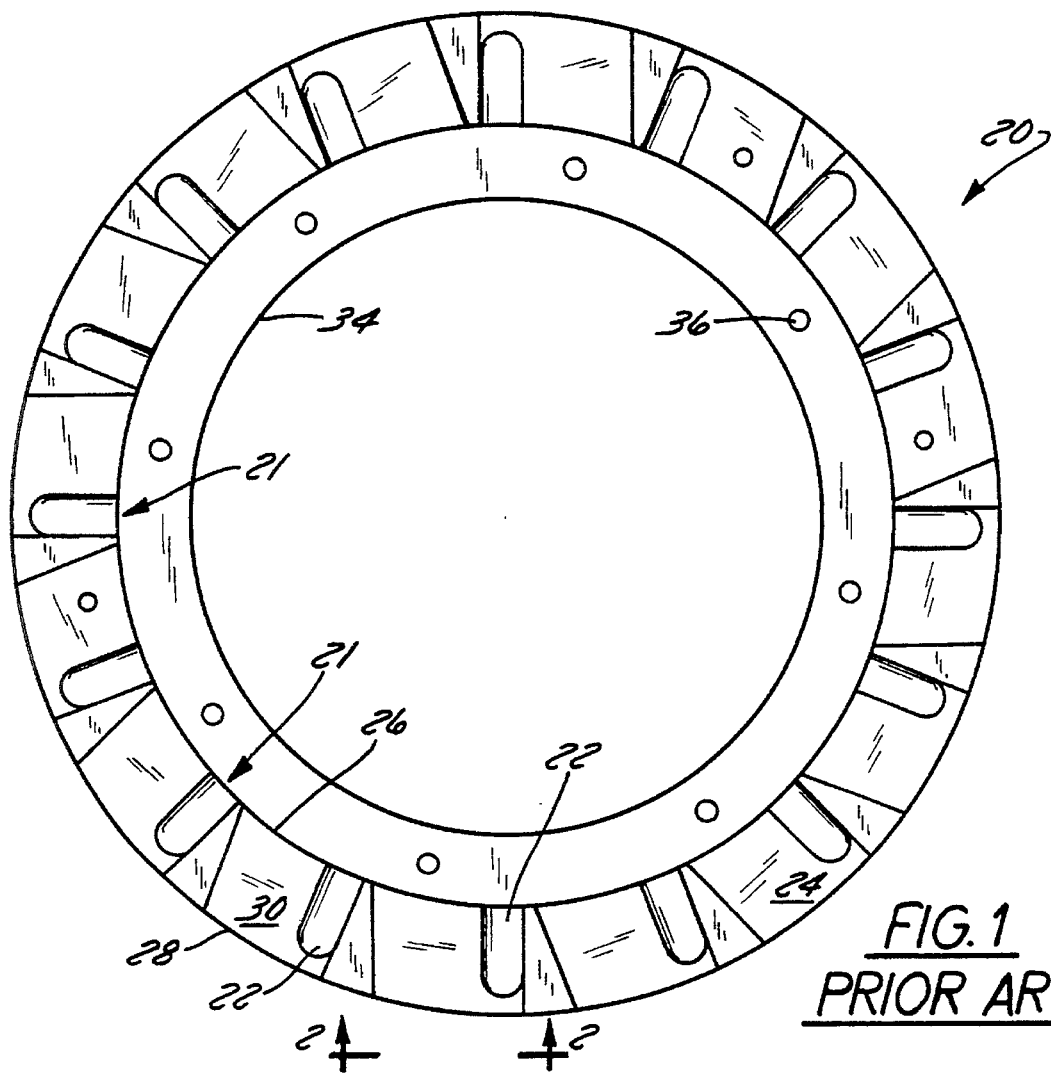
FIG. 1 is a bottom plan view of a prior art upper bearing of a bearing assembly.
Figure 2:
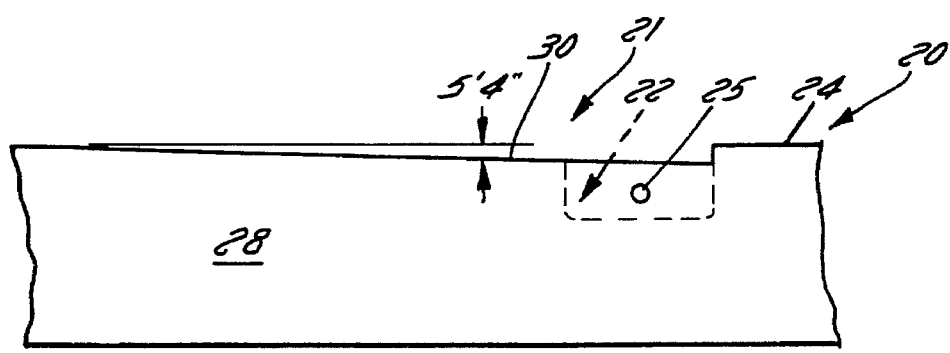
FIG. 2 is a fragmentary side view of the bearing of FIG. 1 taken along line 2—2.
Figure 3:
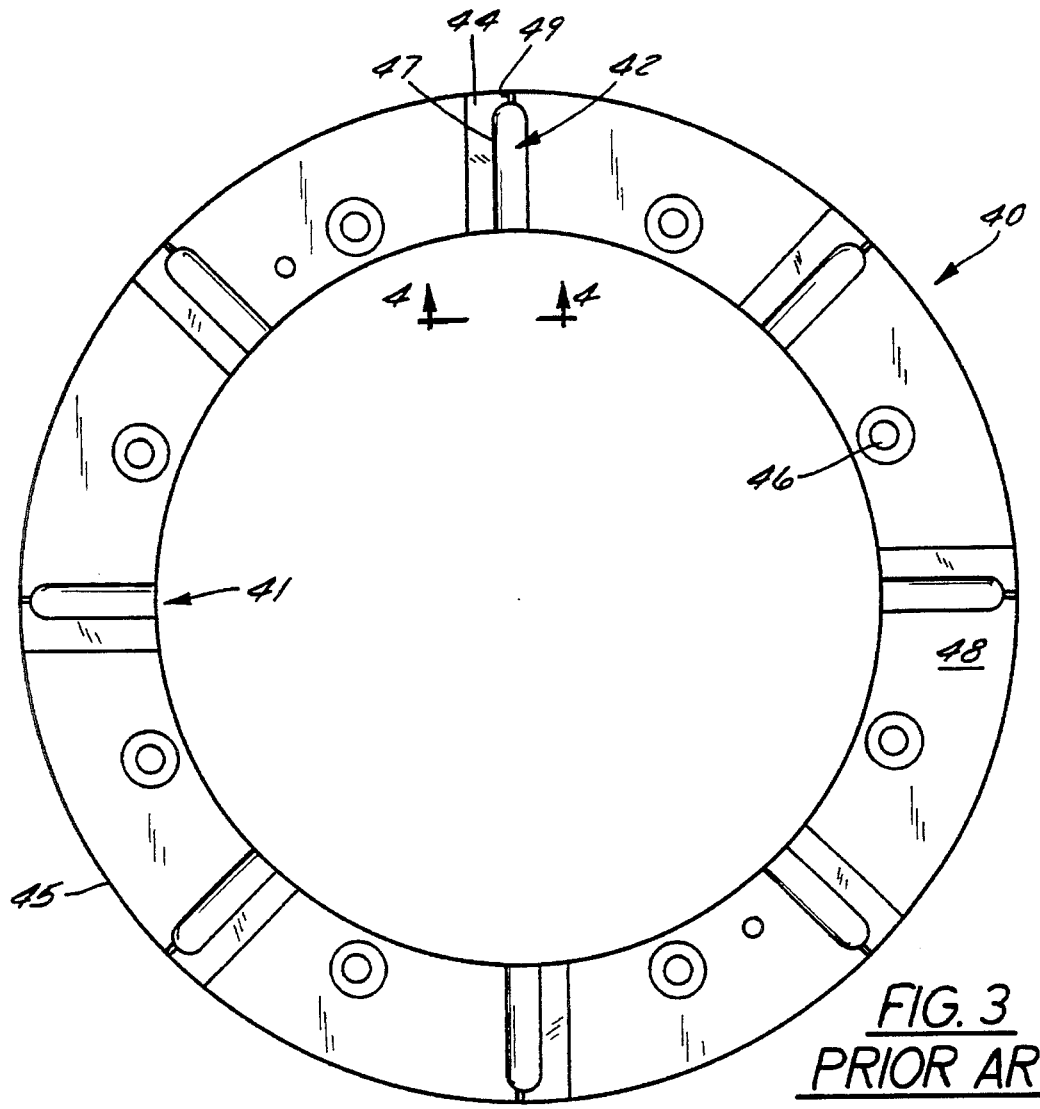
FIG. 3 is a bottom plan view of another prior art upper bearing of a bearing assembly.
Figure 4:
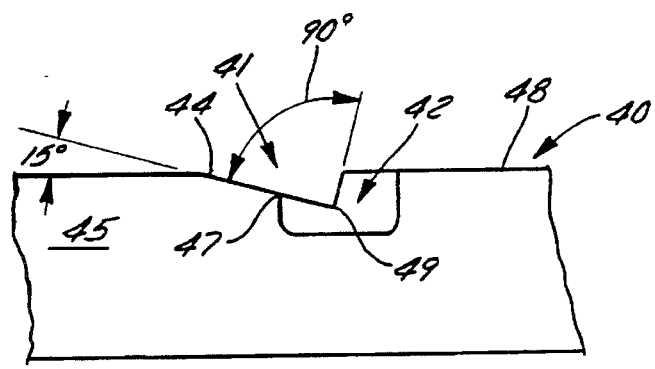
FIG. 4 is a fragmentary side view of the bearing of FIG. 3 taken along line 4—4.
Figure 5:
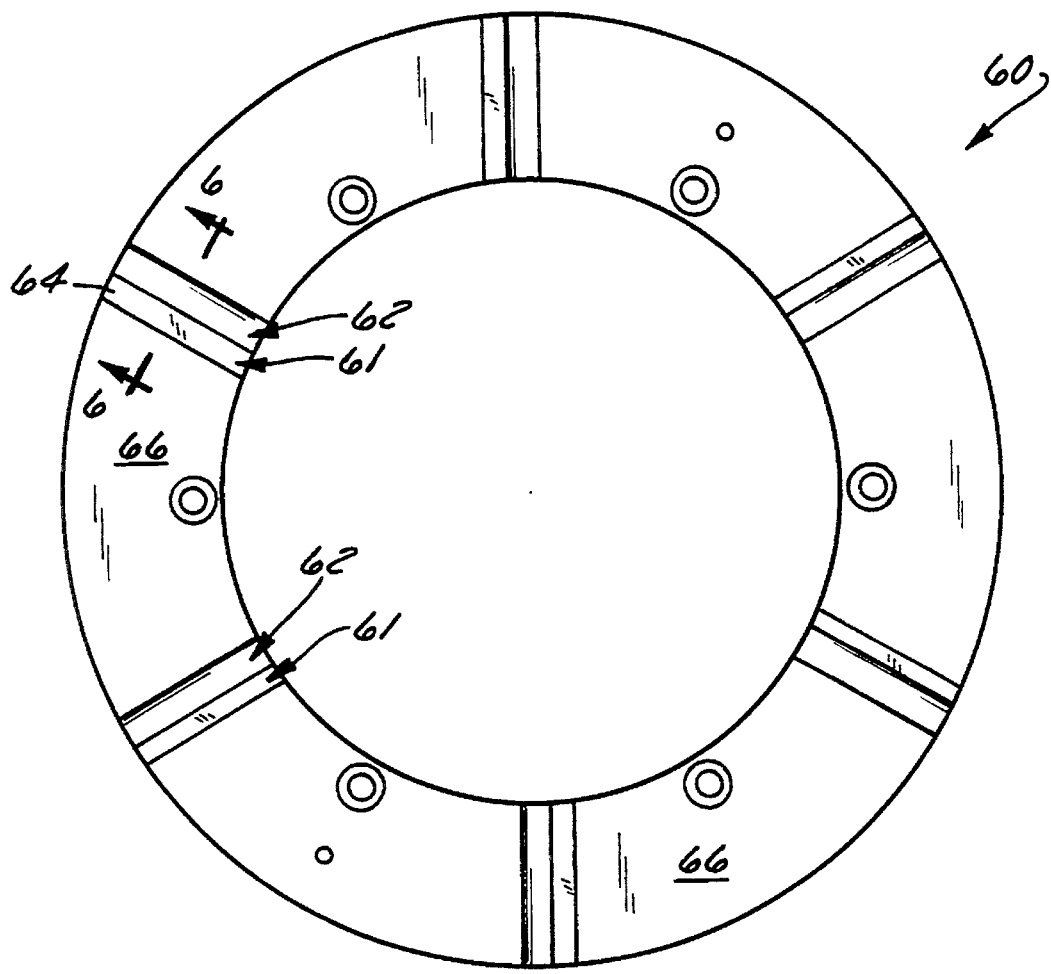
FIG. 5 is a bottom plan view of another prior art upper bearing of a bearing assembly.
Figure 6:
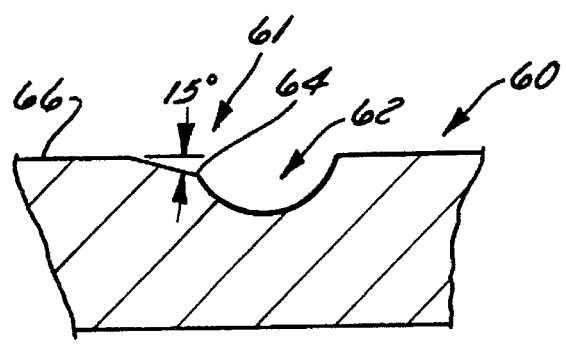
FIG. 6 is a fragmentary side view of the bearing of FIG. 5 taken along line 6—6.
Figure 7:
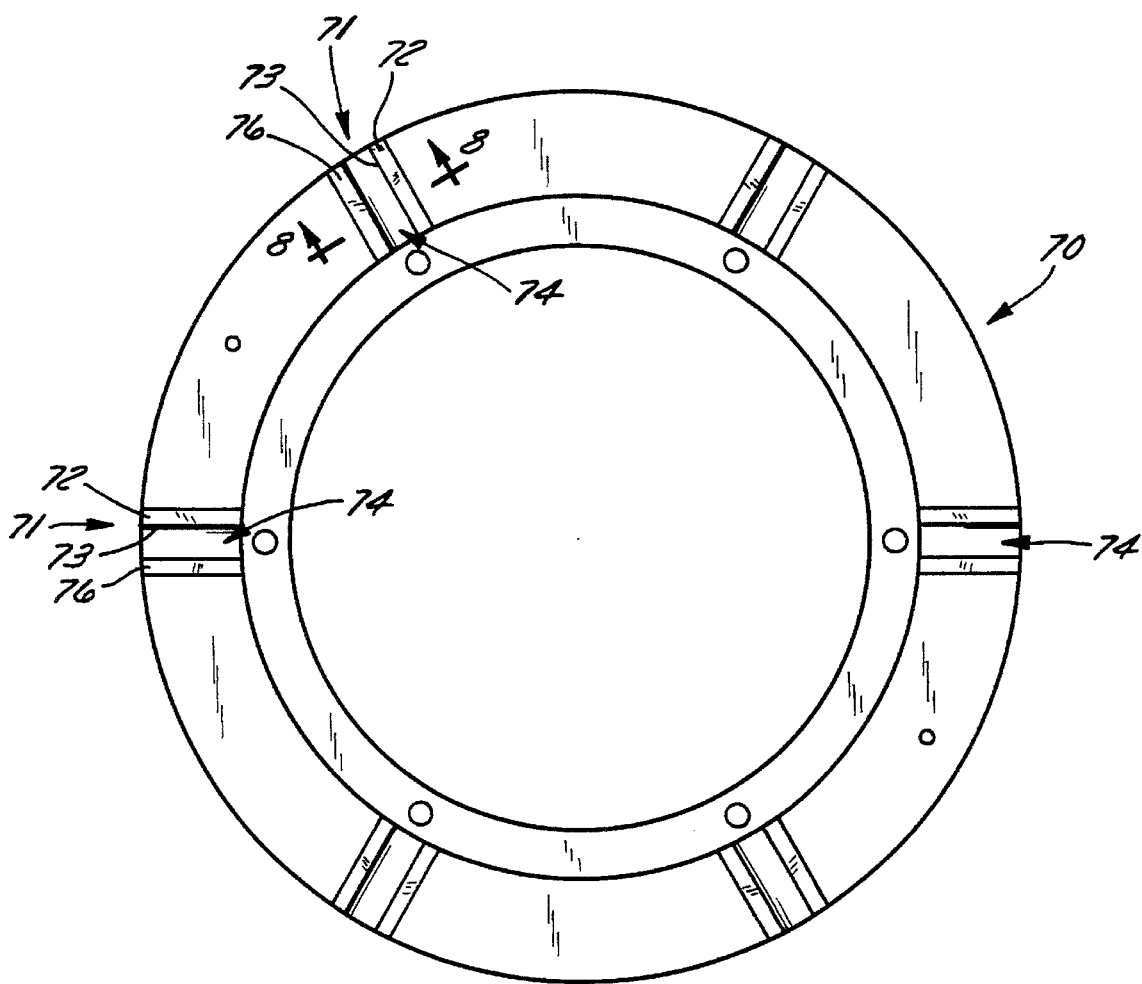
FIG. 7 is a bottom plan view of another prior art upper bearing of a bearing assembly.
Figure 8:
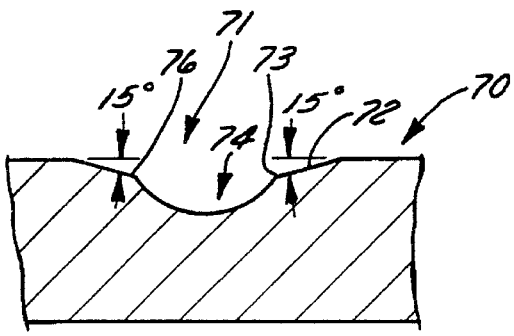
FIG. 8 is a fragmentary side view of the bearing of FIG. 7 taken along line 8—8.
Figure 9:
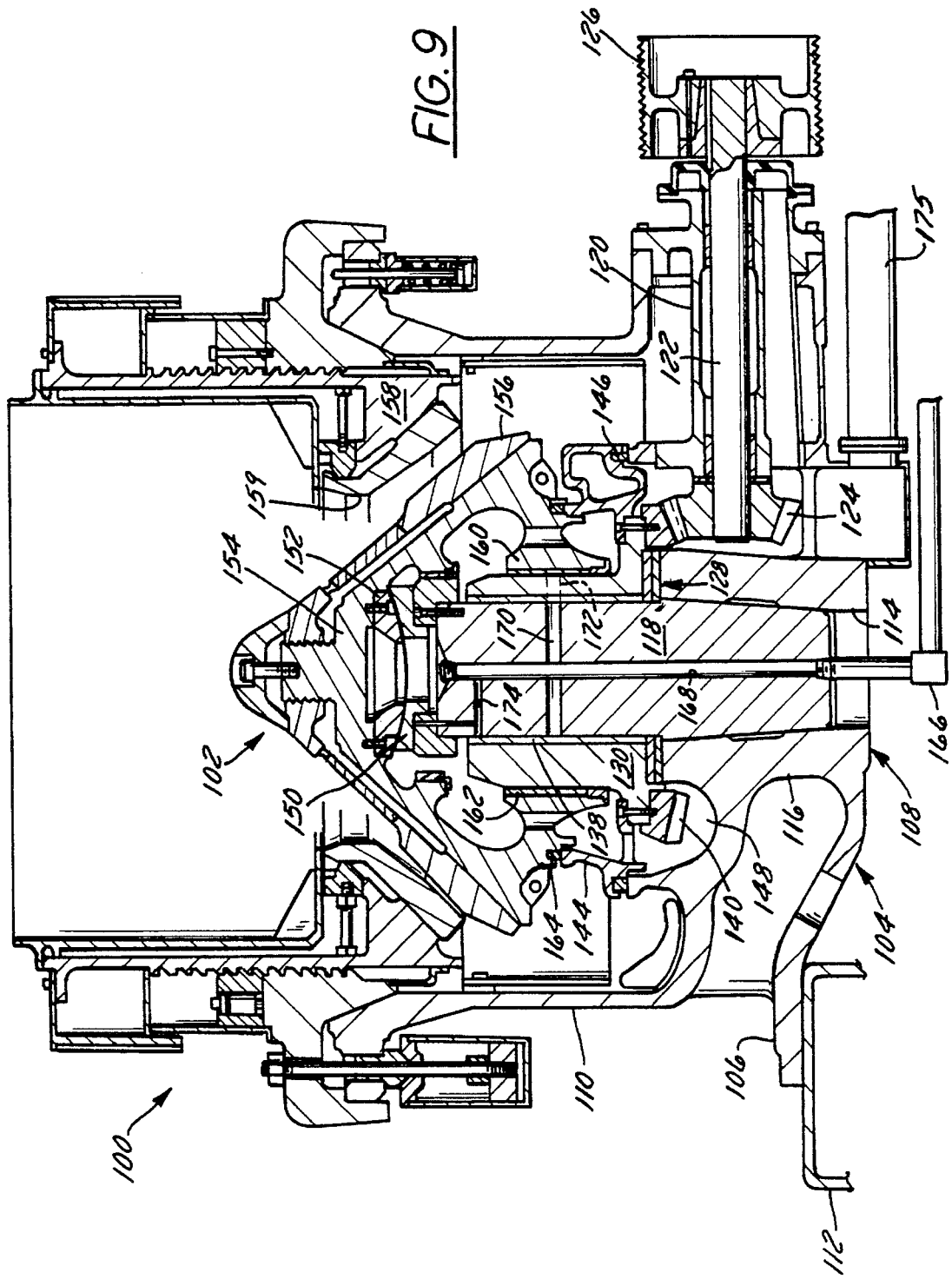
FIG. 9 is a side view in partial section of a crusher assembly suitable for employing the bearing assembly of the present invention.

FIG. 9 shows a conventional conical rock crusher 100 comprising a head assembly 102 and a frame 104 having a base 106, a central hub 108 and a shell 110. Base 106 is secured to a foundation 112 commonly used for crushers of the present type. Central hub 108 is formed by an upwardly diverging vertical bore 114 surrounded by a thick annular wall 116. Vertical bore 114 is adapted to receive a cylindrical support shaft 118. Extending outwardly from central hub 108 is a drive housing 120 enclosing a counter-shaft 122 with a drive pinion 124 adjacent hub 108 and an externally accessible drive pulley 126 for connecting to a suitable drive source.

Figure 10:
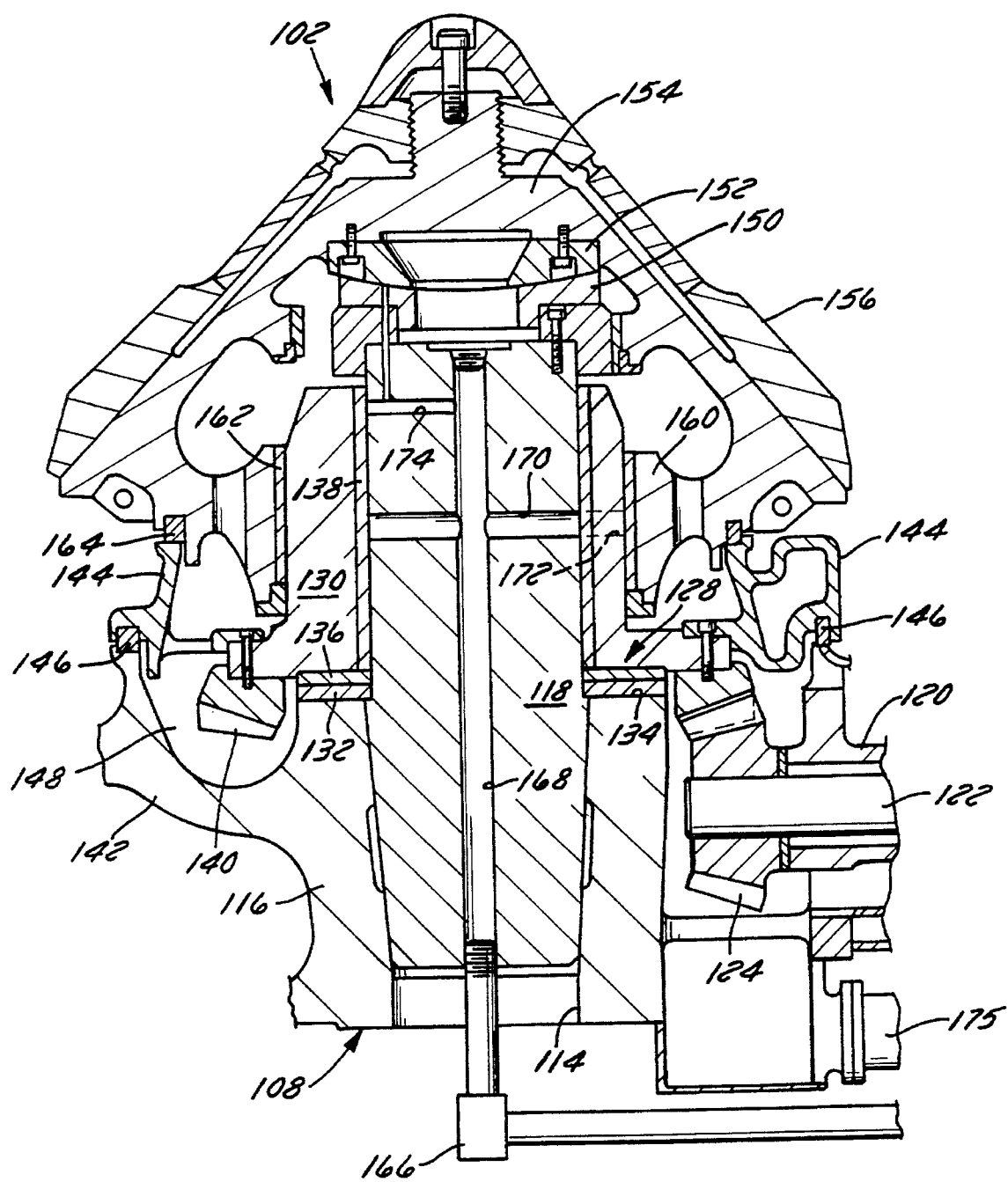
FIG. 10 is an enlarged side view in partial section of a crusher assembly suitable for employing the bearing assembly of the present invention.

Referring to FIG. 10, a thrust bearing assembly 128 supports an eccentric 130 for rotation about vertical shaft 118. Thrust bearing assembly 128 includes a stationary annular thrust bearing 132 bolted to an annular terminal surface 134 on the upper end of annular wall 116 of hub 108, and a rotatable annular thrust bearing 136 bolted to the lower end of eccentric 130. Eccentric 130 is rotatable about shaft 118 via an annular inner bushing 138. An annular gear 140 is bolted to the lower end of eccentric 130 for meshing engagement with pinion 124. A flange 142 extends radially outwardly and upwardly from central hub 108 terminating adjacent the lower end of a counterweight 144. Positioned between flange 142 and counterweight 144 is a seal 146 of conventional type, which completes a gear well 148.

Cylindrical support shaft 118 extends above eccentric 130 for supporting a socket or spherical seat 150. Seated on seat 150 is a spherical upper bearing 152 for supporting head assembly 102. Head assembly 102 comprises a conical head 154, the exterior of which is covered by a wearing mantle 156 for engaging the material to be crushed. Spaced circumferentially around head assembly 102 and supported by frame 104 is a bowl 158 (see FIG. 9) fitted with a liner 159 comprising an opposing surface of mantle 156 for crushing the material.

Extending inwardly of conical head 154 is a follower 160 having a lower head bushing 162 disposed closely around the outer surface of eccentric 130. A seal 164 is positioned between the lower edge of follower 160 and the upper edge of counterweight 144.

Lubrication is supplied to the crusher assembly through an oil inlet line 166 which communicates with a main oil passage 168 formed in shaft 118. Lubricant is provided to inner bushing 138 via a passage 170 which extends on both sides of passage 168, and through a passage 172 to head bushing 162. Additionally, lubricant penetrates to bearing 152 via a passage 174 and to thrust bearing assembly 128 after draining from bushing 138. A drain 175 is provided to remove oil draining from pinion 124, eccentric 130 and thrust bearing assembly 128.

Figure 11:
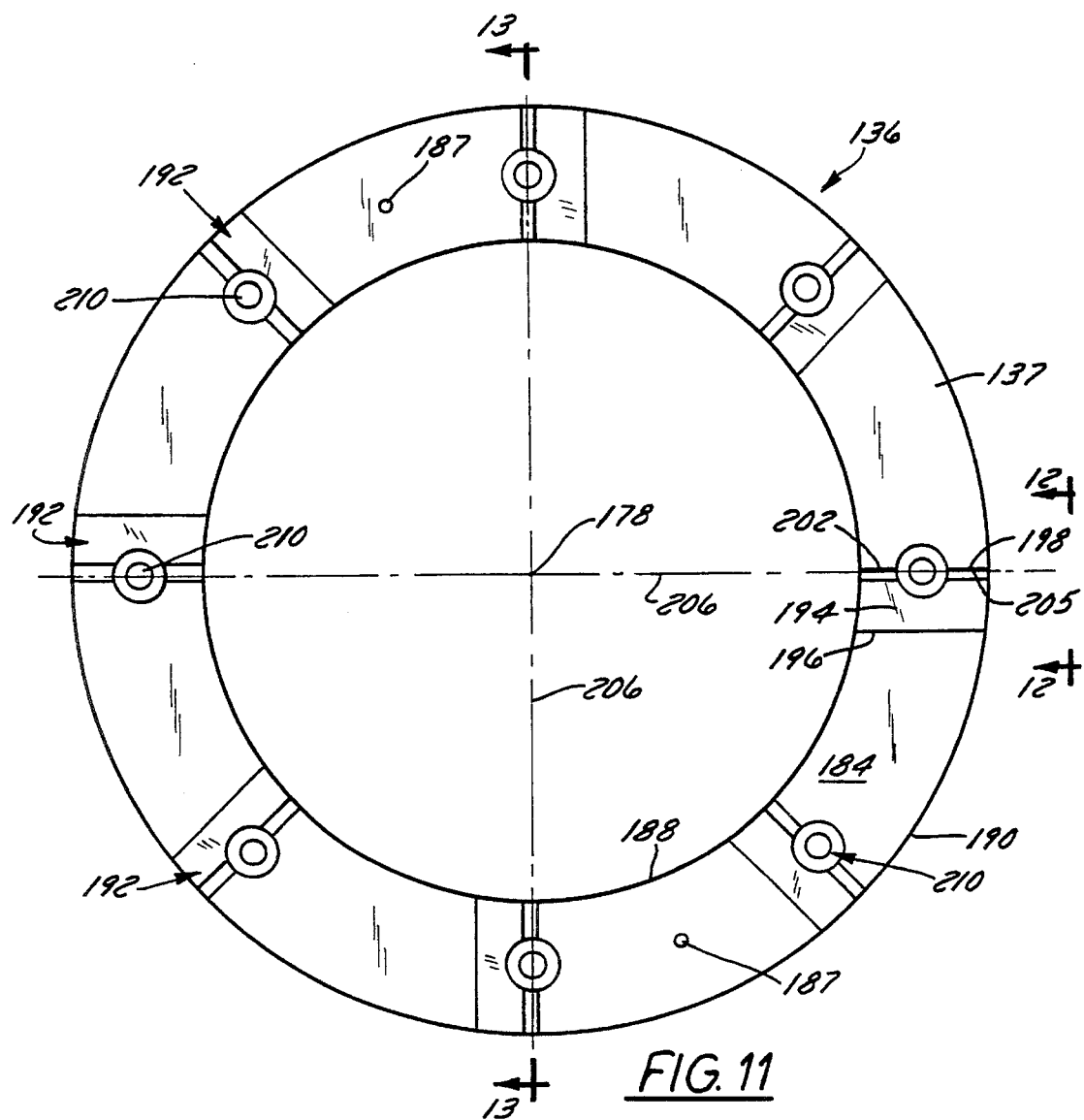
FIG. 11 is a bottom plan view of an upper bearing of a bearing assembly of the present invention.
Figure 12:
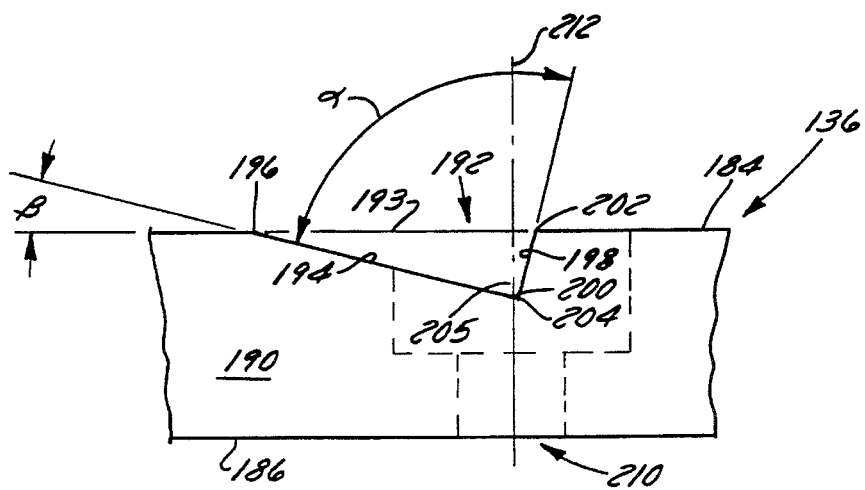
FIG. 12 is a fragmentary side view of the bearing of FIG. 11 taken along line 12—12.
Figure 13:
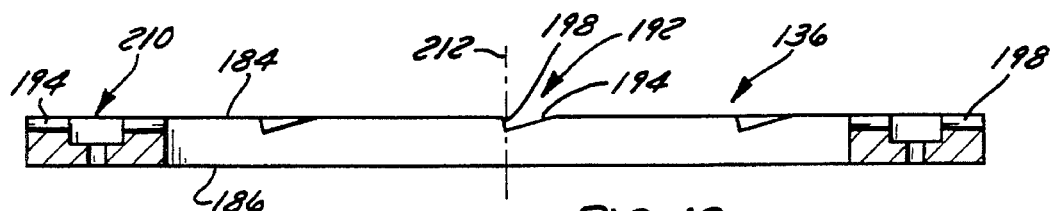
FIG. 13 is a side sectional view of the bearing of FIG. 11 taken along line 13—13.
Figure 14:
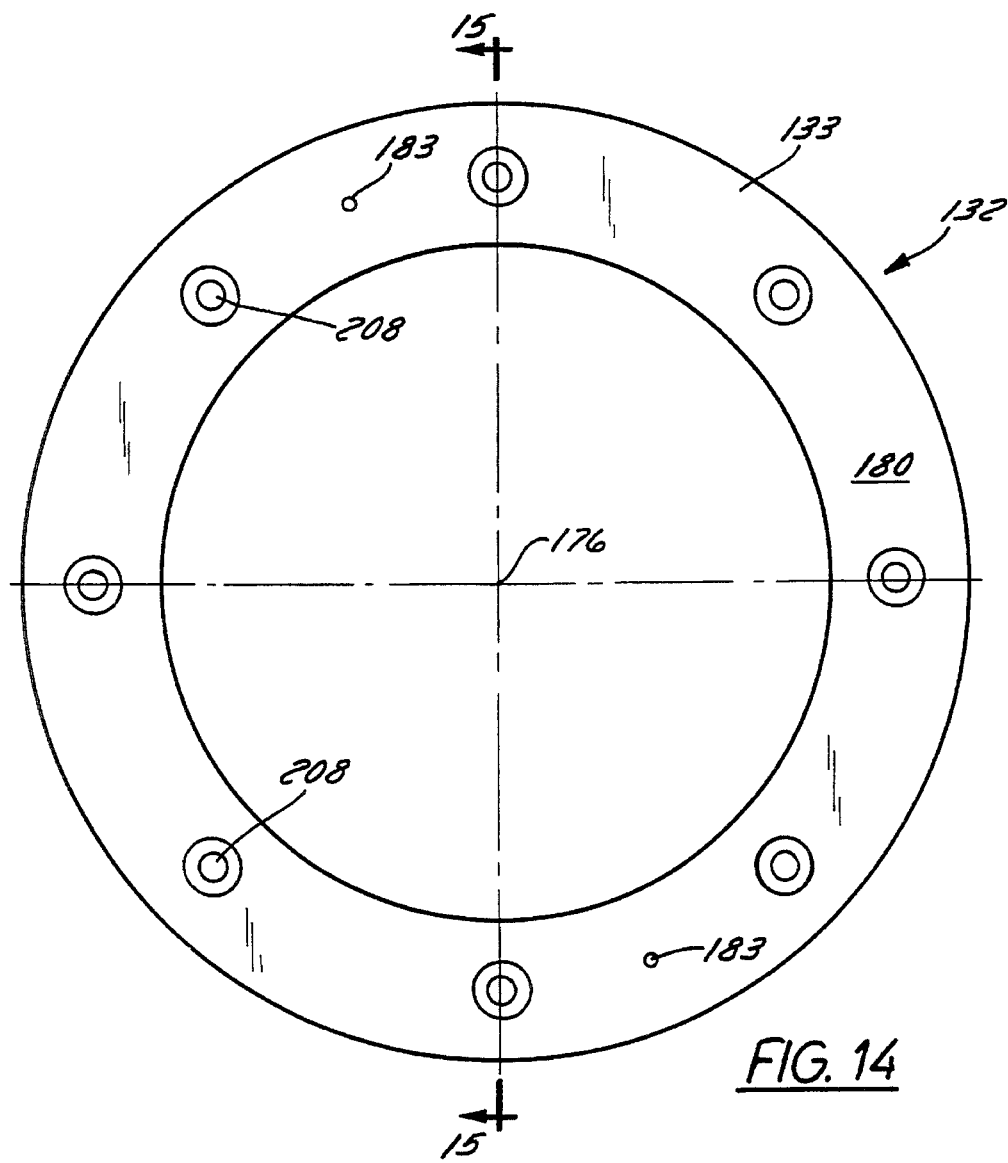
FIG. 14 is a top plan view of a lower bearing of a bearing assembly of the present invention.
Figure 15:
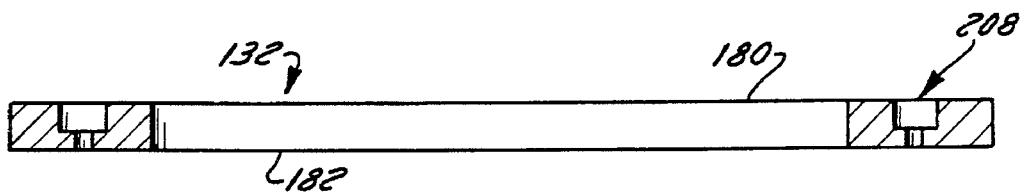
FIG. 15 is a side sectional view of the bearing of FIG. 14 taken along line 15—15.

FIGS. 11–13 show the details of rotatable thrust bearing 136 and FIGS. 14–15 show the details of stationary thrust bearing 132. Stationary bearing 132 includes an annular, generally flat plate 133 centered about a bearing axis 176, a generally planar wearing surface 180, and an opposite surface 182. Rotatable bearing 136 includes an annular, generally flat plate 137 centered about a bearing axis 178, a generally planar wearing surface 184, an opposite surface 186. Each plate 133, 137 has a preferred thickness of about 45 millimeters. Wearing surface 184 of rotatable bearing 136 is configured for concentric, sliding engagement with wearing surface 180 of stationary bearing 132. Preferably, stationary bearing 132 is made of steel, and rotatable bearing 136 is made of bronze.

A plurality of lubrication grooves 192 are provided on wearing surface 184 of rotatable bearing 136 extending in a radial direction of bearing 136 from an inner wall 188 to an outer wall 190. Rotatable bearing 136 rotates in a counter-clockwise direction as viewed from the bottom when employed in crusher 100. Thus, each groove 192 comprises a leading ramp 198 diverging from a leading groove edge 202 on wearing surface 184, and a trailing ramp 194 extending from an intersection 200 with leading ramp 198 to a trailing groove edge 196 on wearing surface 184. Trailing ramp 194 and leading ramp 198 intersect at an angle $\alpha$, and trailing ramp 194 diverges from wearing surface 184 at an angle $\beta$. Thus, as shown by FIG. 12, each groove 192 has a generally triangular cross section defined by a line 193, angle $\alpha$ opposite line 193, and angle $\beta$ adjacent line 193. Preferably, angle $\alpha$ is about 90° and angle $\beta$ is about 15°. Thus, the triangular cross section is preferably in the shape of a right triangle having the hypotenuse (i.e., line 193) coplanar with wearing surface 184 and the smaller angle (i.e., angle $\beta$) trailing with respect to the rotation of bearing 136.

Intersection 200 comprises a curved transition area 204 having a transition axis 205 collinear with a radius 206 of bearing axis 178. Alternatively, intersection 200 could be discontinuous. Trailing groove edge 196 and leading groove edge 202 are parallel with radius 206 so that groove 192 has a consistent triangular cross section throughout its entire length. Preferably, transition area 204 has a radius of curvature of about 3 millimeters, and trailing ramp 194 and leading ramp 198 are tangential to the curvature.

The width of each groove 192 is defined as the distance from leading edge 202 to trailing edge 196 taken along planar wearing surface 184 (e.g., line 193), which is preferably about 61 millimeters. The depth of each groove 192 is defined as the maximum distance between planar wearing surface 184 and transition area 204 as taken along a line perpendicular to surface 184, which is at least about 14 millimeters and preferably about 14.58 millimeters. Thus, each groove 192 of bearing 136 extends to about ⅓ the total thickness of bearing 136.

With each groove 192 having the same, generally triangular cross section along its entire length, the entire length of groove 192 can easily be cut in a single milling operation using a suitable machine known in the art, such as a boring bar. That is, the machining of groove 192 requires only a single 90° cut rather than the two or more cuts required for making a groove having both a deep central cut and a shallower ramp, as in the prior art bearings described above. In addition, because each groove 192 extends from inner wall 188 across wearing surface 184 to outer wall 190 at a substantial depth, heated lubrication can easily exit groove 192 at outer wall 190 without the need for a separate bleed hole.

A plurality of counter-bored bolt holes 208 are provided on stationary bearing 132 extending from wearing surface 180 to opposite surface 182. Likewise, a plurality of counterbored bolt holes are also provided on rotatable bearing 136 extending from wearing surface 184 to opposite surface 186. In addition, a pair of lifting holes 183 are provided on stationary bearing 132, as well as a pair of lifting holes 187 on rotatable bearing 136, to assist with handling of the bearings.

In the illustrated embodiments, each bearing 132, 136 is provided with eight equally spaced bolt holes. Moreover, each bolt hole 210 on rotatable bearing 136 is preferably positioned so as to overlap with at least a portion of one of the grooves 192. More preferably, at least about ½ of each bolt hole 210 overlaps with one of the grooves 192. In the most preferred embodiment, each bolt hole 210 has a vertical axis 212 passing through transition area 204 of groove 192. That is, each bolt hole 210 is approximately centered on intersection 200 of leading ramp 198 and trailing ramp 194. With this arrangement, each bolt hole 210 substantially coincides with one of the grooves already present on wearing surface 184. Therefore, no additional interruptions are created by the bolt holes on the wearing surface, as is typical of prior art bearings which lack a separate mounting ring.

System parameters and design criteria can affect the placement and dimensions associated with groove 192 and holes 208 and 210. For example, angles α and β of groove 192 can be within a range of 80° to 100° and 5° to 25°, respectively. Preferably, groove 192 is deep enough so lubricant can effectively travel from inner wall 188 to outer wall 190 and, yet, shallow enough so wearing surface 184 can effectively slidably engage surface 180. Groove 192 can be shallower if greater weight is supported by bearing assembly 128 and deeper if less weight is supported by bearing assembly 128. Thus, various system parameters and design criteria can affect the size and shape of grooves 192.

It will be understood that the foregoing description is of preferred exemplary embodiments of the invention, and that the invention is not limited to the specific forms shown. That is, any modifications which may be apparent from reading the foregoing description which do not depart from the scope of the invention as expressed in the appended claims are intended to be covered.

I claim:

1. A thrust bearing system for use in a conical rock crusher, the thrust bearing system being located between a rotational eccentric mechanism and a stationary frame, the thrust bearing system comprising a first bearing and a second bearing, each bearing including an annular, generally flat plate centered about a bearing axis, the flat plate having a generally planar wearing surface and an opposite surface, the wearing surface of the first bearing configured for concentric, sliding engagement with the wearing surface of the second bearing, the wearing surface of the first bearing having a plurality of lubrication grooves, each groove having a length extending in a radial direction of the annular plate from an inner wall of the annular plate across the wearing surface to an outer wall of the annular plate, each groove having a generally triangular cross section throughout the entire length of the groove.

2. The thrust bearing system of claim 1, wherein the first bearing is bronze and the second bearing is steel.

3. The thrust bearing system of claim 1, wherein each groove comprises a first ramp diverging from the wearing surface of the first bearing at a first angle and a second ramp extending from an intersection with the first ramp to the wearing surface of the first bearing, the first ramp and the second ramp intersecting at a second angle.

4. The thrust bearing system of claim 3, wherein the first angle is about 15 degrees and the second angle is about 90 degrees.

5. The thrust bearing system of claim 3, wherein the intersection between the first ramp and the second ramp of each groove comprises a curved transition area having a transition axis collinear with a radius of the bearing axis, wherein the transition area has a radius of curvature of about 3 millimeters and the first ramp and the second ramp are tangential to the curvature.

6. The thrust bearing system of claim 5, wherein the first ramp of each groove intersects the wearing surface along a first line of intersection and the second ramp of each groove intersects the wearing surface along a second line of intersection, and wherein the first and second lines of intersection are parallel with the transition axis of the groove.

7. The thrust bearing system of claim 6, wherein the distance between the first line of intersection and the second line of intersection of each groove is about 61 millimeters, and wherein the depth of the groove is about 14.58 millimeters.

8. The thrust bearing system of claim 5, wherein each bearing further comprises a plurality of bolt holes extending from the wearing surface through the bearing to the opposite surface, each bolt hole having a bolt axis parallel with the bearing axis which intersects the curved transition area.

9. The thrust bearing system of claim 8, wherein the first bearing comprises eight equally spaced grooves and wherein each bearing includes eight equally spaced bolt holes.

10. A rock crusher comprising:
a frame;
a vertical shaft fixedly mounted to the frame;
an eccentric rotatably supported about the shaft; and
a thrust bearing assembly supporting the eccentric, the thrust bearing assembly located between the frame and the eccentric, the thrust bearing assembly including:
a stationary annular thrust bearing fixedly mounted to the frame and coaxial with the shaft, the stationary bearing having a lower surface facing the frame and an upper, generally horizontal surface facing opposite from the lower surface; and
a rotatable annular thrust bearing fixedly mounted to the eccentric and coaxial with the shaft, the rotatable bearing having an upper surface facing the eccentric and a lower, generally horizontal surface facing opposite from the upper surface and disposed concentrically with the upper surface of the stationary bearing for sliding engagement therewith, the lower surface of the rotatable bearing having a plurality of spaced apart lubrication channels, each channel comprising a first ramp diverging from the lower surface of the rotatable bearing and a second ramp extending from an intersection with the first ramp to the lower surface of the rotatable bearing, wherein each channel is capable of being cut in a single machining operation.

11. The thrust bearing assembly of claim 10, wherein the first ramp and the second ramp of each channel intersect at an angle of about 90°, and wherein the first ramp of each channel diverges at an angle of about 15° from the horizontal lower surface of the rotatable bearing.

12. The thrust bearing assembly of claim 10, wherein the rotatable bearing further comprises a plurality of mounting holes extending from the lower surface through the bearing to the upper surface, each hole having an axis generally parallel with the bearing axis and wherein at least a portion of the hole overlaps a portion of one of the grooves.

13. The thrust bearing assembly of claim 12, wherein at least about ½ of each hole overlaps one each of the grooves.

14. The thrust bearing assembly of claim 12, wherein the rotatable bearing comprises eight equally spaced channels and wherein each bearing includes eight equally space mounting holes.

15. The thrust bearing assembly of claim 10, wherein the intersection between the first ramp and the second ramp of each channel comprises a curved transition area having a transition axis collinear with a radius of the bearing axis, and wherein the transition area has a radius of curvature of about 3 millimeters and the first ramp and the second ramp are tangential to the curvature.

16. The thrust bearing assembly of claim 15, wherein the first ramp of each channel intersects the lower surface along a first line of intersection and the second ramp of each channel intersects the lower surface along a second line of intersection, and wherein the first and second lines of intersection of each channel are parallel with the respective transition axis.

17. The thrust bearing assembly of claim 16, wherein the distance between the first line of intersection and the second line of intersection of each channel is about 61 millimeters, and wherein the depth of the channel is about 14.58 millimeters.

18. The thrust bearing assembly of claim 16, wherein the first bearing is bronze and the second bearing is steel.

19. A rotatable annular thrust bearing for use in a thrust bearing assembly, the thrust bearing assembly for use in a rock crusher to rotatably support an eccentric about a vertical shaft fixedly mounted within a frame of the crusher, the thrust bearing assembly including a nonrotatable annular thrust bearing adapted to be fixedly mounted to the frame and coaxial with the shaft, the nonrotatable bearing having a lower surface facing the frame and an upper, generally horizontal surface facing opposite from the lower surface, the rotatable annular thrust bearing being adapted to be fixedly mounted to the eccentric, the rotatable annular thrust bearing comprising:

an upper surface; and a lower surface having a plurality of grooves, each groove comprising a first ramp diverging from the lower surface and a second ramp extending from an intersection with the first ramp to the lower surface of the rotatable bearing, wherein each groove is capable of being cut in a single machining operation.

20. The rotatable annular thrust bearing of claim 19, further comprising a plurality of mounting holes extending from the lower surface of the rotatable bearing through the rotatable bearing to the upper surface, each hole having an axis generally parallel with the axis of the shaft and wherein at least a portion of the hole overlaps a portion of one of the grooves.

21. The rotatable annular thrust bearing of claim 19, wherein the lower surface of the rotatable bearing is in sufficiently close spaced apart relationship with the upper surface of the nonrotatable bearing to form a bearing gap for carrying liquid lubricant, the shape and length of each groove being effective for allowing oil to flow into each groove from a lubricant source located radially inwardly of the bearings and to exit the groove radially outwardly of the bearings, and wherein the first ramp diverges from the lower surface at a first angle effective for spreading a thin layer of oil in the bearing gap when the rotatable bearing is rotated.

22. The rotatable annular thrust bearing of claim 21, wherein each groove has a generally triangular cross section, and wherein each groove extends from an inner wall of the bearing to an outer wall of the bearing, whereby the groove does not require a bleed hole.

23. The rotatable annular thrust bearing of claim 22, wherein the first ramp and the second ramp of each groove intersect at a second angle, and wherein the first angle is about 15° and the second angle is about 90°.

* * * * *